June 30, 1942.　　A. KINDELMANN ET AL　　2,288,001
FRAMING MECHANISM FOR A MOTION PICTURE PROJECTOR
Filed Sept. 10, 1938　　3 Sheets-Sheet 1

INVENTOR.
ALBERT KINDELMANN
LEO THOMA
BY H. W. Baker
ATTORNEY

June 30, 1942.    A. KINDELMANN ET AL    2,288,001
FRAMING MECHANISM FOR A MOTION PICTURE PROJECTOR
Filed Sept. 10, 1938    3 Sheets-Sheet 2
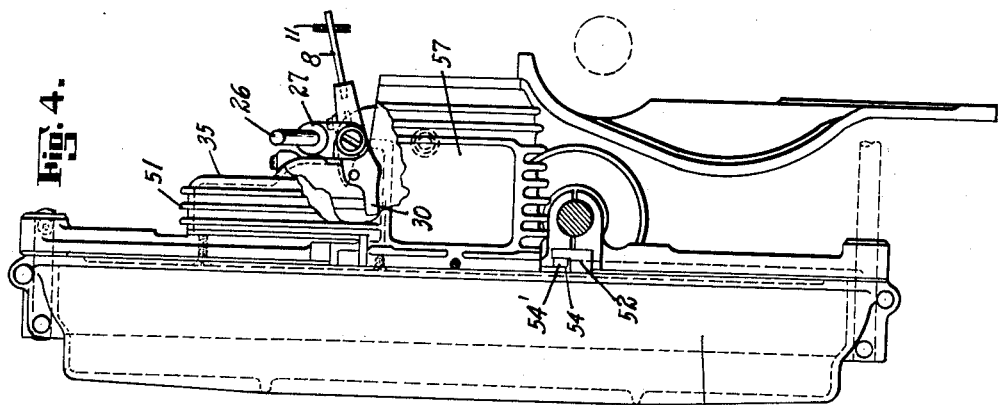
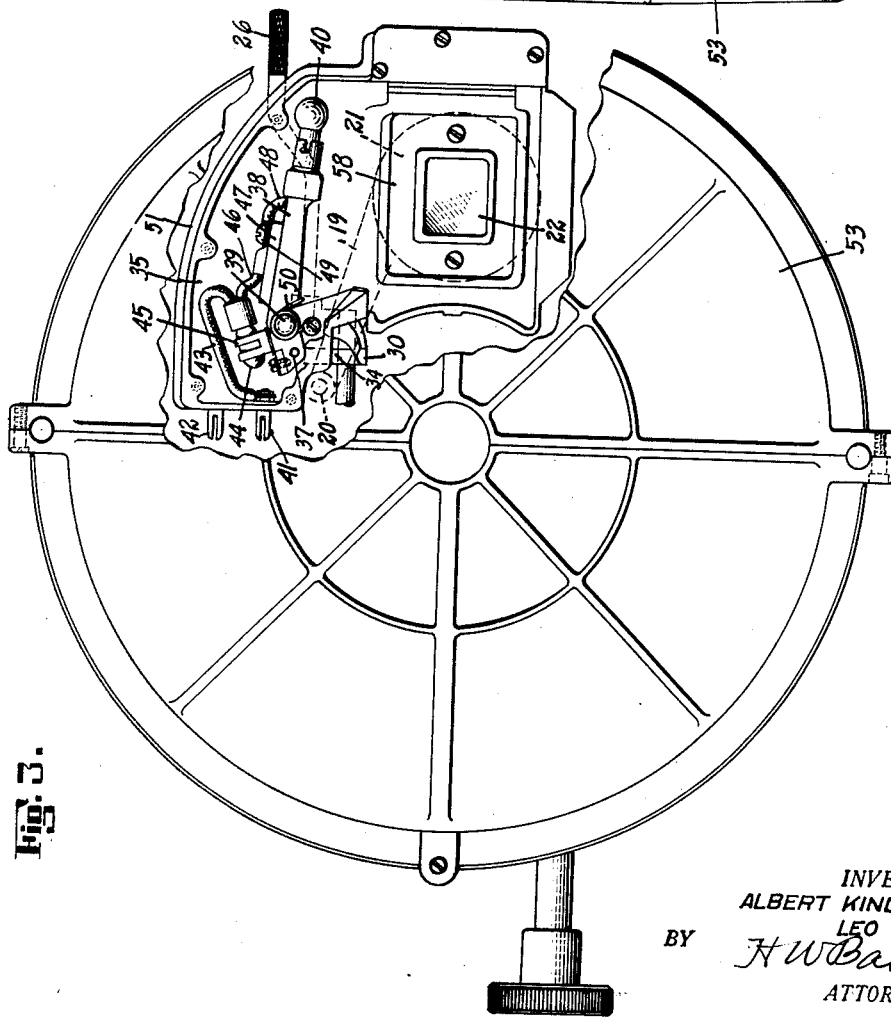
INVENTOR.
ALBERT KINDELMANN
LEO THOMA
BY H. W. Baker
ATTORNEY.

June 30, 1942.  A. KINDELMANN ET AL  2,288,001
FRAMING MECHANISM FOR A MOTION PICTURE PROJECTOR
Filed Sept. 10, 1938  3 Sheets-Sheet 3
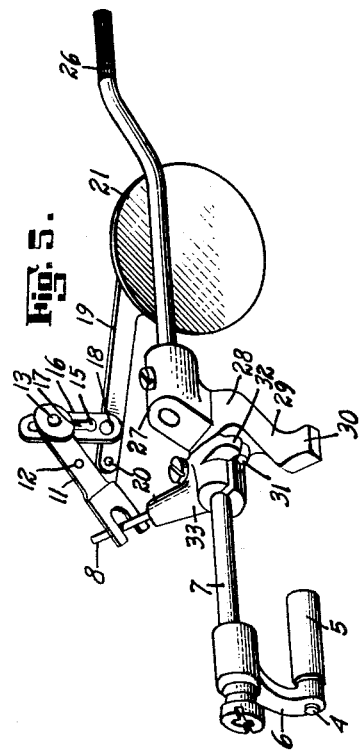
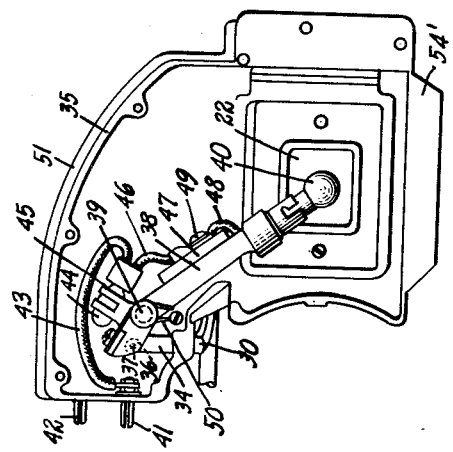
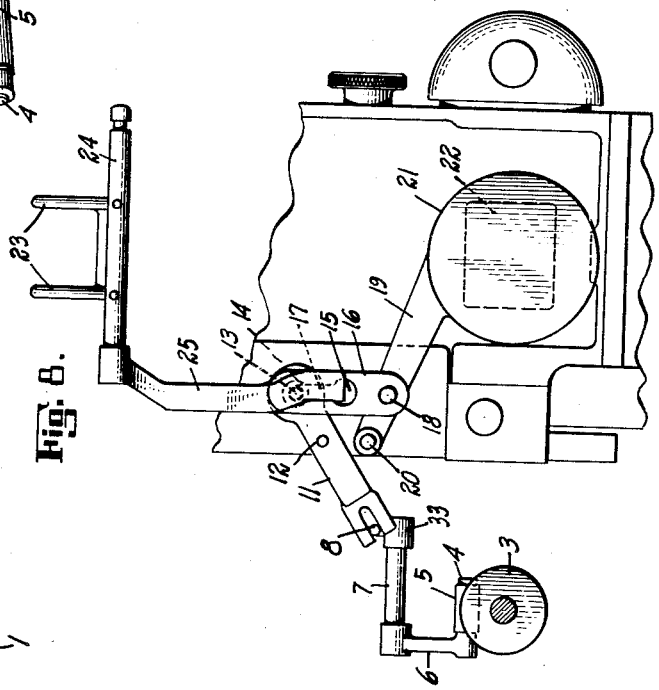
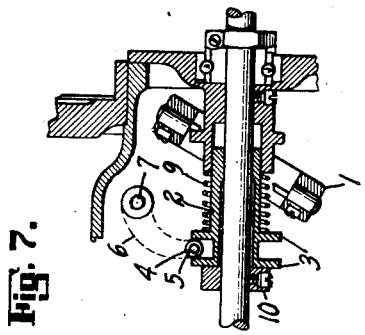
INVENTOR.
ALBERT KINDELMANN
LEO THOMA
BY *H.W.Baker*
ATTORNEY Patented June 30, 1942

2,288,001

UNITED STATES PATENT OFFICE 2,288,001

FRAMING MECHANISM FOR MOTION PICTURE PROJECTORS

Albert Kindelmann, Floral Park, and Leo Thoma, Richmond Hill, N. Y., assignors to International Projector Corporation, New York, N. Y., a corporation of Delaware Application September 10, 1938, Serial No. 229,270

9 Claims. (Cl. 88—17)

The object of this invention is to provide an improved framing mechanism for a motion picture projector and more specifically it relates to a means to remove the fire shutter from adjacent the film aperture and positioning a framing light so that the light therefrom will pass through the said aperture and film so that the operator can see how the picture would appear on the screen and could thereby correctly frame the same by the conventional framing mechanism.

Another object of the invention is providing a sight box which is readily removable and in which sight box the said framing light is positioned together with at least a portion of the actuating mechanism for the framing light.

Another object of the invention is the placing of cooling or heat dissipating fins on the said sight box so that the heat from the conventional arc lamp will be more readily dissipated.

Another object of the invention is providing the side opening in the sight box with a plurality of plates to reflect the heat away from the said opening.

Figure 2:
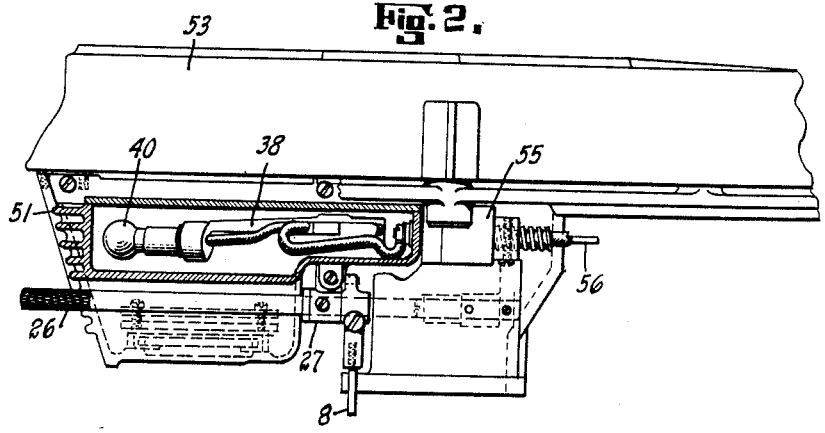
Figure 1:
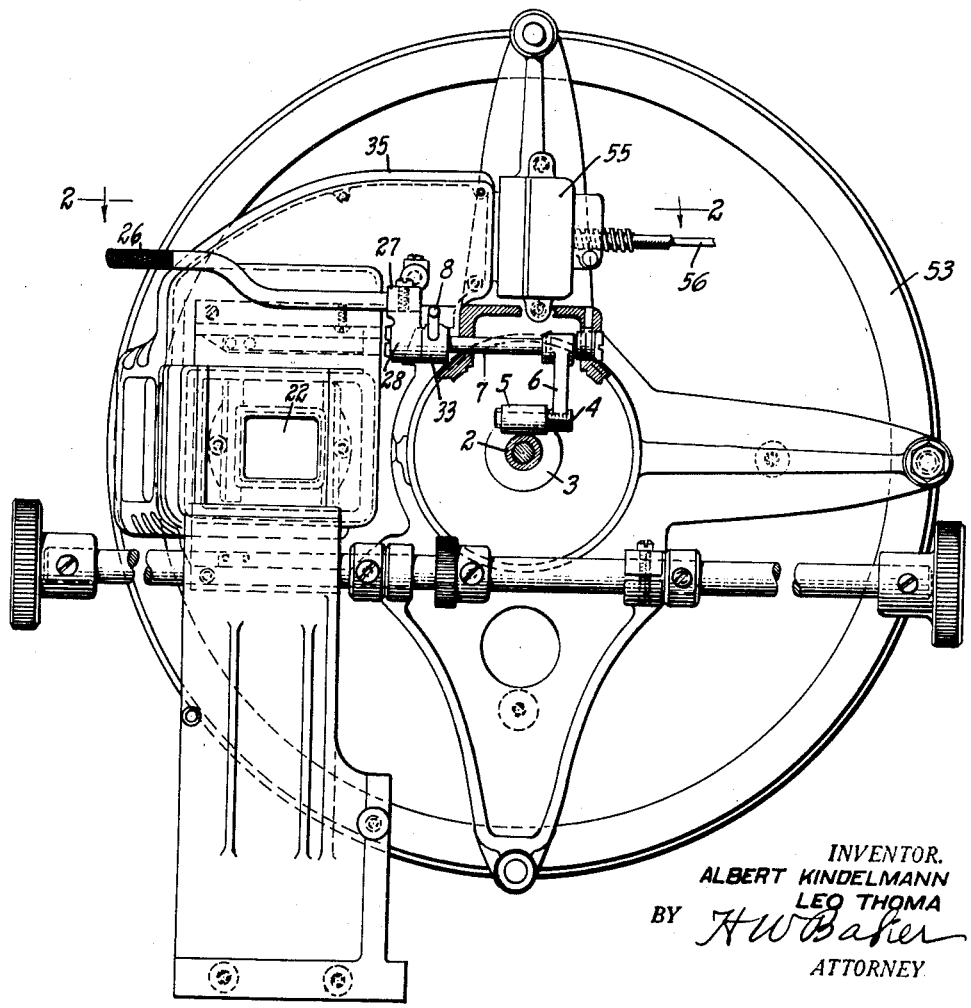

Other objects and advantages of the invention will appear in the detailed specification and claims which follow. The invention may be best understood by referring to the attached drawings in which, Fig. 1 is a view looking rearwardly of the rear shutter assembly having a part of our invention incorporated thereon, Fig. 2 is a plan view on the line 2—2 of Fig. 1 looking in the direction of the arrows, Fig. 3 is a view similar to Fig. 1, but taken from the opposite side of the rear shutter assembly shown in Fig. 1, certain of the parts being cut away to show the internal structure, Fig. 4 is a view taken at right angles to Fig. 3 and showing the right side of the rear shutter assembly with part of our improved structure incorporated thereon, Fig. 5 is a perspective view of the fire shutter and a part of the means whereby the same is operated and controlled, Fig. 6 is a side elevational view of the sight box with the framing light mounted therein, Fig. 7 is a cross sectional view of the ring type governor and mechanism directly controlled thereby, and Fig. 8 is an elevational view of the fire shutter and certain of the means to control the same as viewed when looking forwardly of the projector.

As shown in the application of Kindelmann and Boecking, Serial No. 223,195, filed on August 5, 1938, a ring type governor 1 remains in the position shown in Fig. 7 when the said governor is not rotating, but is moved to a vertical position or slightly beyond the same when the governor is rotated as shown in the said application. This governor is attached to a sleeve 2 which carries two plates 3 forming a valley between said plates and in this valley extends an arm 4 provided with the roller bearing 5, which arm is carried by a lever 6 secured to a shaft 7 which carries an arm 8. A spring 9 tends to move the sleeve 2 to the left as viewed in Fig. 7 so as to engage a stop 10 but when the governor is rotated, the governor pulls the sleeve 2 to the right as viewed in Fig. 7 against the compression of the spring 9 and thereby rotates the shaft 7 and arm 8 so as to raise or lower the said arm 8.

As shown in the said application, the arm 8 projects between bifurcations of a lever 11 which is pivoted on a pin 12 and at its opposite end carries a pin 13 having an enlargement 14. The enlargement 14 is normally seated in a hole 15 in a link 16. The link 16 is provided with a vertically extending slot 17 which is sufficiently wide to receive the pin 13 but is not sufficiently wide to receive the enlargement 14. The link 16 carries a pin 18 which is mounted on a lever 19 which lever is pivoted on a pin 20. The lever 19 terminates in a circular disc forming a fire shutter 21 which, as shown in Fig. 8, covers the film aperture 22 when the machine is not being operated. When, however, the governor 1 is rotated, the arm 8 is lowered thereby raising the enlargement 14, link 16, lever 17 and fire shutter 21, thereby elevating the fire shutter above the film aperture 22.

In the said application there were also shown spring arms 23 which would be raised in case film should break and the film should pile up below the spring arms. These spring arms are secured to a shaft 24 which carries a lever 25, the lower end of which is in alignment with the pin 13 and which would serve as a means to push the pin so as to push the enlargement out of the hole 15 so that only the pin 13 would be above the slot 17, which would allow the fire shutter to drop by gravity even though the governor continued to rotate at its regular speed so that the lever 11 was held stationary.

In the said application there was, therefore, shown a structure whereby the fire shutter would close the film aperture if the governor was rotated at less than its required speed, mechanism whereby the said shutter would be raised in case the governor were rotating at its normal operating speed and means whereby the shutter would be released and allowed to drop by gravity in case the spring arms 23 were raised by film piling up beneath the same.

We propose to raise the fire shutter 21 manually while the governor 1 is remaining stationary and simultaneously throw a framing light to the center of the film aperture. It is, of course, understood that in doing this the regular arc lamp would not be used and the framing lamp would be used in its place for otherwise the heat from the arc lamp might set the film on fire, especially so since the film has a very slight movement while being framed.

This object is accomplished by providing a lever 26 projecting into one arm 27 of a bell crank lever 28 loosely mounted on shaft 7 which lever has an arm 29 terminating in a foot 30 and is also provided with a pin 31. The pin 31 underlies an arm 32 of a member 33 secured to the shaft 7 and which member 33 is the connecting means between the shaft 7 and the said arm 8 as shown in Fig. 5. If the lever 26 is actuated so as to raise the pin 31 the lever 8 will be lowered while the pin 13, link 16, lever 19 and fire shutter 21 will be raised. Therefore, all the operator has to do to raise the fire shutter 21 above the aperture 22 is to press the said lever 26 forward, and in doing this he raises the foot 30. The foot 30 extends beneath a plunger 34 which is slidably mounted in the sight box housing 35. The plunger 34 is provided at its upper end with an open laterally extending slot 36 which receives a pin 37 carried by a lever 38 which lever is pivoted on a pin 39. This lever 38 is provided with a framing light 40 which, when the foot 30 is raised, is lowered to a position about the center of the aperture 22. This light is connected to a terminal 41 and is grounded to a terminal 42. The terminal 41 is connected to a lead 43 which extends to one terminal of a mercury switch 44 which is resiliently held in spring arms 45 carried by the lever 38 so that the mercury switch could be readily removed if desired. A lead 46 extends from the other terminal of the mercury switch to an insulated block 47. A lead 48 is held in engagement with one end of the lead 46 by means of a screw 49. By releasing the screw 49 and the connection to the terminal 41 the mercury switch and the leads extending from and to the same may be readily removed. The lead 48 extends to the framing light 40. When the framing light is in the position shown in Fig. 3, the framing light will not be illuminating for the mercury in the switch will not contact the two terminals thereof, but when the operator throws the lever 26 he raises the fire shutter 21 as above described and lowers the framing light 40 to the approximate center position of the aperture 22 and the mercury in the switch moves so as to close the two terminals thereof so that the light 40 is now illuminated. When the operator releases the lever 26, the spring 9, as previously described in connection with Fig. 7, will move the fire shutter 21 so as to close the aperture and will lower the foot 30 away from the plunger 34 so that a spring 50 coiled about the pin 39 will raise the light 40.

When the fire shutter is raised and the framing light 40 is lowered so that its beam of light will pass through the aperture and the film, of course, the picture can be seen through the aperture, and the operator can then move the film upwardly or downwardly so that a portion of two pictures would not appear on the screen at the same time. While he is thus framing the picture, of course, the conventional arc lamp is not used for it would set the film on fire as above mentioned.

The sight box housing 35 is provided with outwardly extending heat dissipating fins 51 so as to readily dissipate the intense heat from the conventional arc lamp.

The sight box is readily connected or disconnected with the remainder of the projection machine and to this end we have provided a trackway 52 on the rear shutter housing 53. The lower portion of the sight box is provided with a flange 54' adapted to be inserted in the trackway 52 and held in place by pressure springs 54 which extends horizontally so that the said sight box may be readily inserted on the rear shutter housing and held in position therein. There is a similar such trackway, flange and spring to hold the top of the sight box. The plunger 34 will not be in the way for its downward limit of movement by means of the spring 50 is limited by the left hand side of the lever 38 engaging the bottom wall of the housing as is clearly shown in Fig. 3. The terminals 41 and 42 carried by the sight box housing will be projected into suitable terminals in the terminal housing 55 which receives the required leads 56. The side face of the sight box housing 35 is provided with an opening 57 covered by a pane of glass.

On the inside of the sight box housing and surrounding the aperture 22 is a plurality of heat dissipating plates terminating in a reflector plate 58. These plates serve the function of dissipating the heat going through the said aperture.

We realize that many changes may be made in the specific form of the invention shown by way of illustration in this application, and we, therefore, desire to claim the same broadly reserving to ourselves the right to make all changes which may fairly fall within the scope of the appending claims.

Having now described our invention, we claim:

1. In a motion picture projector having a film aperture, a framing lamp, a lever on which said lamp is mounted, positioning means whereby said lever may be moved to position said lamp in framing position relative to said aperture, a circuit leading to said lamp, means on said lever to close the circuit when the lever is moved to position said lamp in framing position relative to said aperture, and spring means to move said lever to remove the lamp from framing position and to open said circuit when the positioning means is released.

2. In a motion picture projector having a film aperture, a framing lamp, a lever on which said lamp is mounted, a circuit leading to said lamp, positioning means whereby said lever may be actuated to move the lamp into framing position relative to the aperture, a mercury switch on said lever to close said circuit when said lever is actuated to move the lamp into framing position, and means automatically to return said lever so as to remove said lamp from framing position and to open said circuit when the positioning means is released.

3. In a motion picture projector, a lamp housing provided with electrical terminals, a terminal housing carried by the projector, a guide rail having a fixed part carried by the projector, a flange carried by the lamp housing and adapted to be received between the rail and the fixed part of the projector so that the said lamp housing may be slid into position so that the terminals carried by the lamp housing will be received within the terminal housing.

4. In a motion picture projector having a film aperture, a lamp, a lever on which said lamp is mounted, slidable means to move said lever to position said lamp so that it will be in framing position relative to said aperture, manually operatable means and a foot carried by the manually operatable means underlying said slidable means and serving as the means to move said slidable means and actuate said lever to position said lamp into framing position relative to said aperture.

5. In a motion picture projector having a film aperture, a shaft, a manually operable member loosely mounted on said shaft and having a foot, a slidable rod adapted to be raised by said foot, a lever actuated by said rod, a light mounted on said lever and adapted to be moved into position adjacent said aperture when the foot is raised, a shutter, means to raise the shutter when the light is lowered and spring means to raise the light and lower the shutter when the manually operable member is released.

6. In a motion picture projector, a shaft, a shutter operating lever secured to said shaft and provided with an arm, a manually operable member, a framing light controlled by said manually operable member, a pin carried by said manually operable member and underlying said arm so that when the manually operable member is operated to move said framing light the lever is actuated.

7. In a motion picture projector having an aperture, a fire shutter, a framing light, manually actuatable means having a one way connection with the fire shutter and serving as a means to move said framing light adjacent the aperture and simultaneously to move the fire shutter away from the aperture and means to move the framing light away from the aperture and to move the shutter to close the aperture when the manually actuatable means is released.

8. In a motion picture projector having a film aperture, a lamp, a lever on which said lamp is mounted, slidable means to move said lever to position said lamp so that it will be in framing position relative to said aperture, a circuit leading to said lamp, means on said lever to close the circuit when the lever is moved to position said lamp in framing position relative to said aperture, and manually operatable means to actuate said slidable means.

9. In a motion picture projector having a film aperture, a lamp, a lever on which said lamp is mounted, slidable means to move said lever to position said lamp so that it will be in framing position relative to said aperture, a circuit leading to said lamp, means on said lever to close the circuit when the lever is moved to position said lamp in framing position relative to said aperture, manually operatable means to actuate said slidable means, and means to remove said lamp from the framing position relative to said aperture when the manually operatable means is released.

ALBERT KINDELMANN.
LEO THOMA.